United States Patent
Vasilevskiy et al.

(10) Patent No.: US 8,738,293 B2
(45) Date of Patent: May 27, 2014

(54) APPARATUS AND METHOD FOR MULTI-SENSOR ESTIMATION OF A PROPERTY OF AN EARTH FORMATION

(75) Inventors: Alexandr N. Vasilevskiy, Novosibirsk (RU); Yuliy A. Dashevsky, Novosibirsk (RU); Daniel T. Georgi, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 386 days.

(21) Appl. No.: 12/777,511

(22) Filed: May 11, 2010

(65) Prior Publication Data
US 2010/0286967 A1    Nov. 11, 2010

Related U.S. Application Data

(60) Provisional application No. 61/177,043, filed on May 11, 2009.

(51) Int. Cl.
*G01V 1/40*    (2006.01)

(52) U.S. Cl.
USPC ............................................................ 702/6

(58) Field of Classification Search
USPC ......... 702/6, 11–14, 104, 150, 188, 189, 196; 73/152.05
See application file for complete search history.

(56) References Cited

U.S. PATENT DOCUMENTS

| | | |
|---|---|---|
| 5,821,413 A | 10/1998 | Chapin |
| 2003/0220750 A1* | 11/2003 | Delhomme et al. ............ 702/50 |
| 2004/0250614 A1* | 12/2004 | Ander ........................ 73/152.05 |
| 2005/0269082 A1 | 12/2005 | Baron et al. |
| 2008/0295594 A1 | 12/2008 | Aliod et al. |
| 2009/0223291 A1 | 9/2009 | Donadille et al. |

OTHER PUBLICATIONS

Last, B. J. and K. Kubik, "Compact Gravity Inversion," Geophysics, vol. 48, No. 6, Jun. 1983, pp. 713-721.
Portniaguine, Oleg and Michael S. Zhdanov, "Focusing Geophysical Inversion Images," Geophysics, vol. 64, No. 3, May-Jun. 1999, pp. 874-887.
Notification of Transmittal of the International Search Report and the Written Opinion of the International Searching Authority, or the Declaration; PCT/US2010/034367; Jan. 26, 2011.

* cited by examiner

*Primary Examiner* — Mohamed Charioui
(74) *Attorney, Agent, or Firm* — Cantor Colburn LLP

(57) ABSTRACT

An apparatus for estimating a property of an earth formation includes: a plurality of sensors configured to estimate at least one property, each of the plurality of sensors located at a known position relative to one another; and a processor in operable communication with the plurality of sensors and configured to estimate uncertainties of the location of the plurality of sensors over a period of time. A method and computer program product for estimating a property of an earth formation is also disclosed.

25 Claims, 12 Drawing Sheets

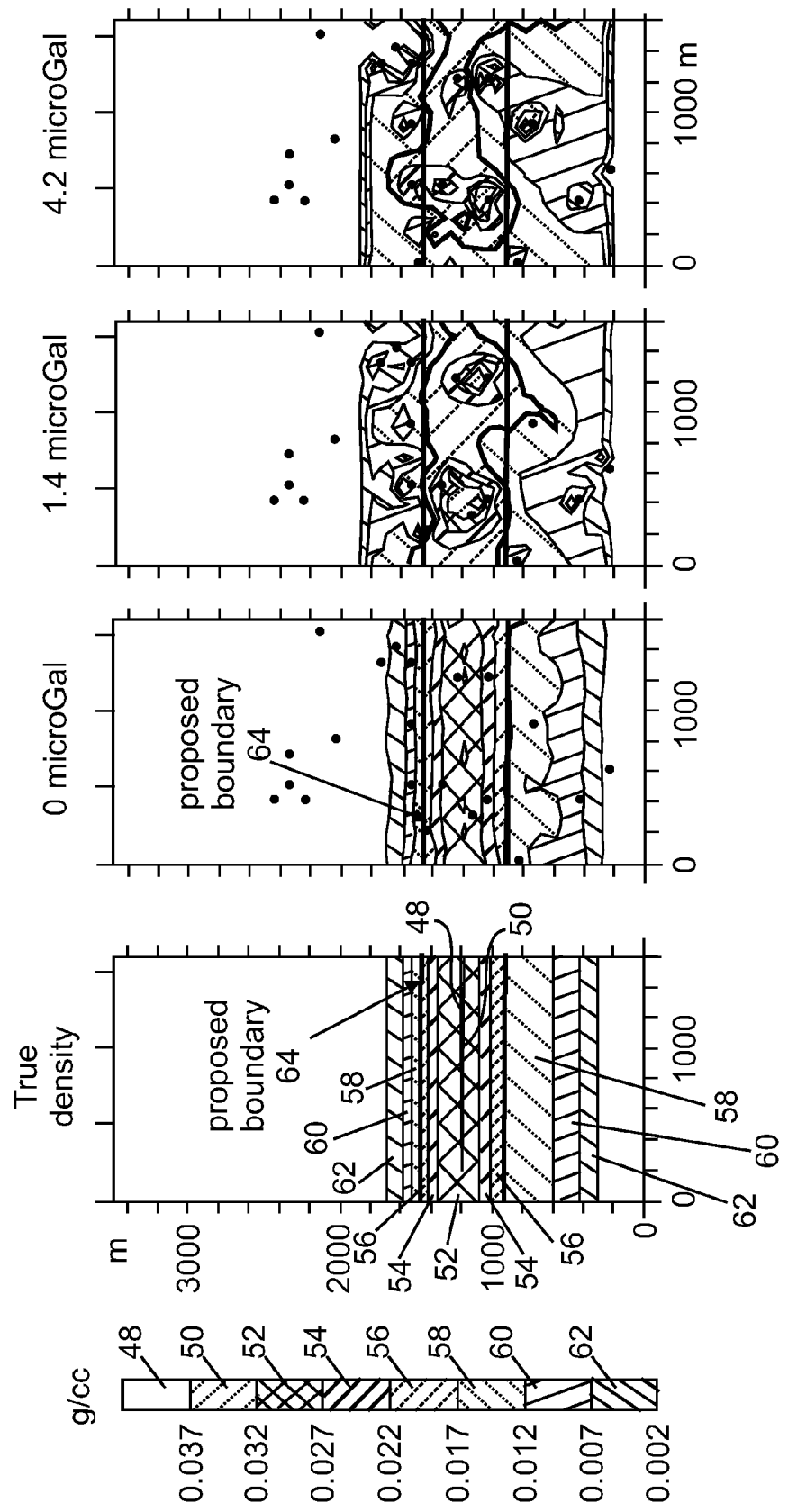

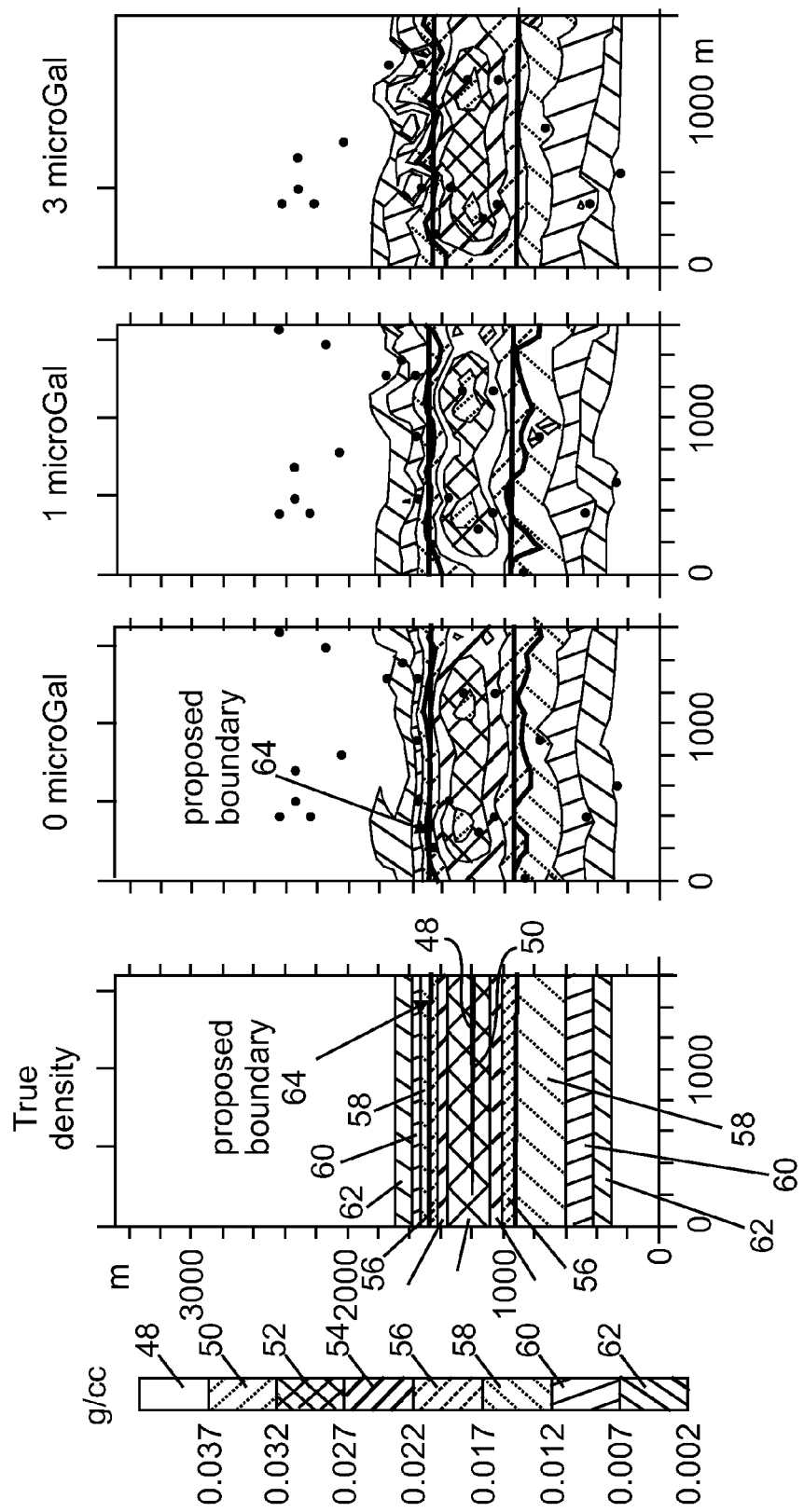

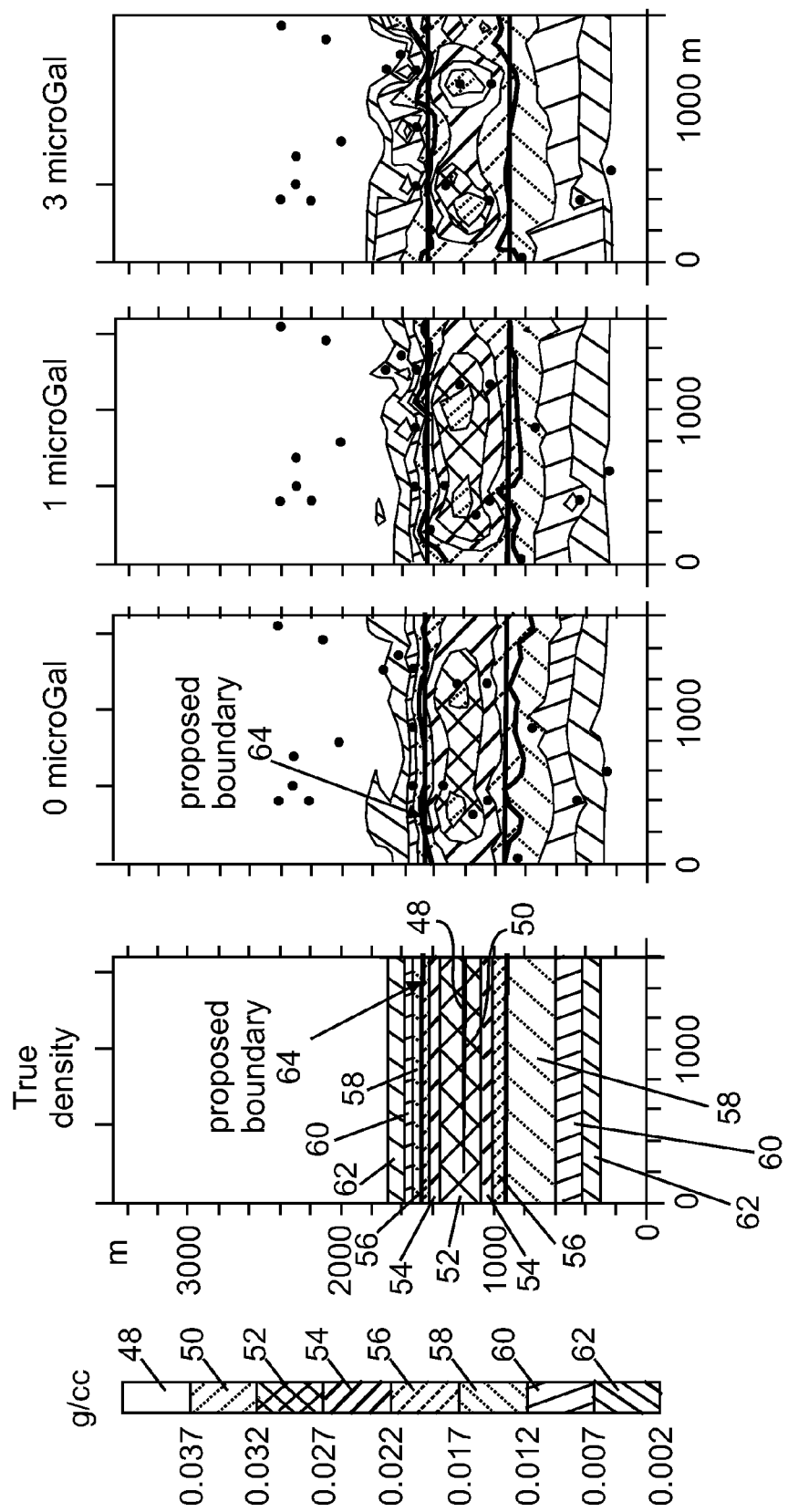

APPARATUS AND METHOD FOR MULTI-SENSOR ESTIMATION OF A PROPERTY OF AN EARTH FORMATION

CROSS-REFERENCE TO RELATED APPLICATIONS AND PRIORITY CLAIM

This application claims the benefit of U.S. Provisional Application Ser. No. 61/177,043, entitled "APPARATUS AND METHOD FOR MULTI-SENSOR ESTIMATION OF A PROPERTY OF AN EARTH FORMATION", filed May 11, 2009, under 35 U.S.C. §119(e), and which is incorporated herein by reference in its entirety.

BACKGROUND OF THE INVENTION

During hydrocarbon drilling and recovery operations, and in an effort to identify petroleum sources underground, various properties of earth formations are measured by lowering measurement tools into a drilled borehole. For example, field of gravity measurements are taken in boreholes to monitor deep water fluids within underground reservoirs. From a geophysical point of view, a high level of precision and repeatability of borehole measurements determine the success of monitoring earth formations. Data of a high quality obtained through a high quality measurement tool may be contaminated by errors due to a poor level of repeatability.

Depth error of the tool position, i.e., movement of the tool producing variations in depth over repeated measurements, leads to errors in the measured signal. For example, downhole gravity measurements include an additional error term ("$\delta g$") due to an input from the normal gradient ("$\delta g_0$") of the gravity field, and also due to variations in the medium in which the measurements are performed ("$\delta g_s$"). A "Gal" is a unit of gravitational acceleration ("g") equal to 1 cm/sec$^2$. Typically, this additional term is approximated by a double Bouguer correction. The error $\delta g$ in tool positioning can be interpreted as a random measurement error depending on rock density and relative displacement.

One approach for reducing the error relating to unknown displacement involves measuring the vertical gradient of the borehole gravity. However, such measurement has various shortcomings, including low signal levels and high locality characteristics. The concept of a locality characteristic of gravity method is strongly linked to the relative contribution of different parts of the investigated medium to the measured signal. The smaller the contribution from the medium parts situated far from the measuring point, the higher the locality feature and vice versa.

BRIEF SUMMARY OF THE INVENTION

An apparatus for estimating a property of an earth formation includes: a plurality of sensors configured to estimate at least one property, each of the plurality of sensors located at a known position relative to one another; and a processor in operable communication with the plurality of sensors and configured to estimate uncertainties of the location of the plurality of sensors over a period of time.

A method of estimating a property of an earth formation includes: disposing a plurality of sensors at a selected location, the plurality of sensors located at a known position relative to one another; estimating at least one property via the plurality of sensors by taking at least two measurements with the plurality of sensors, each of the at least two measurements being temporally separated within a selected time period; and estimating uncertainties of the location of the plurality of sensors within the selected time period.

A computer program product is disclosed that includes machine readable instructions stored on machine readable media. The instructions are for estimating a property of an earth formation by implementing a method including: disposing a plurality of sensors at a selected location, the plurality of sensors located at a known position relative to one another; estimating at least one property via the plurality of sensors by taking at least two measurements with the plurality of sensors, each of the at least two measurements being temporally separated within a selected time period; and estimating uncertainties of the location of the plurality of sensors within the selected time period.

BRIEF DESCRIPTION OF THE DRAWINGS

The following descriptions should not be considered limiting in any way. With reference to the accompanying drawings, like elements are numbered alike:

FIG. 7 depicts exemplary results of the inversion of vertical gradient of gravity measurements taken with a single gravity sensor;

FIGS. 9A and 9B depict exemplary results of the inversion of gravity measurements taken with the exemplary measurement assembly of FIG. 2;

DETAILED DESCRIPTION OF THE INVENTION

Figure 1:
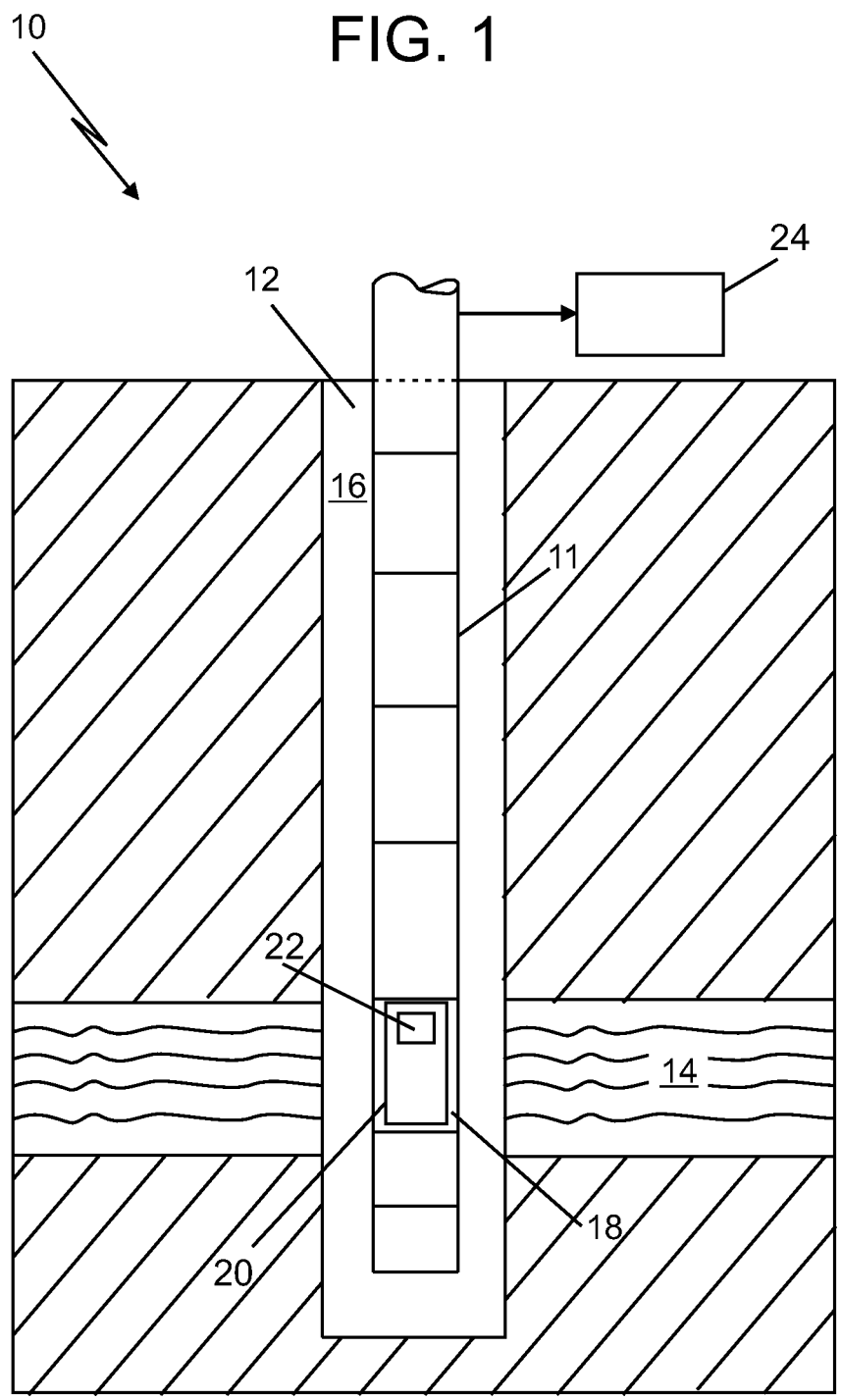
FIG. 1 depicts an embodiment of a well logging and/or drilling system.

Referring to FIG. 1, an exemplary embodiment of a well logging, production and/or drilling system 10 includes a borehole string 11 that is shown disposed in a borehole 12 that penetrates at least one earth formation 14 during a drilling, well logging and/or hydrocarbon production operation. In one embodiment, the string 11 includes a drill pipe, which may be one or more pipe sections or coiled tubing. In one embodiment, the system 10 also includes a bottomhole assembly (BHA) 18. A borehole fluid 16 such as a drilling or completion fluid or drilling mud may be pumped through the drillstring 11, the BHA 18 and/or the borehole 12.

The BHA 18, or other portion of the borehole string 11, includes a measurement assembly 20 configured to estimate at least one property of the formation 14 and/or the borehole 12. The assembly 20, in one embodiment, includes a data processing unit 22 for processing and/or presenting data related to the at least one property. In one embodiment, the data processing unit 22 and/or the measurement assembly 20 is incorporated into or is in communication with a surface processing unit 24. The BHA 18 and/or the measurement assembly 20 incorporates any of various transmission media and connections, such as wired connections, fiber optic connections, wireless connections and mud pulse telemetry.

In one embodiment, the data processing unit 22 and/or the surface processing unit 24 includes components as necessary to provide for storing and/or processing data collected from the assembly 20. Exemplary components include, without limitation, at least one processor, storage, memory, input devices, output devices and the like. In one embodiment, the data processing unit 22 and/or the surface processing unit 24 is configured as a control unit to control the operation of the measurement assembly and/or other components of the system 10.

Figure 2:
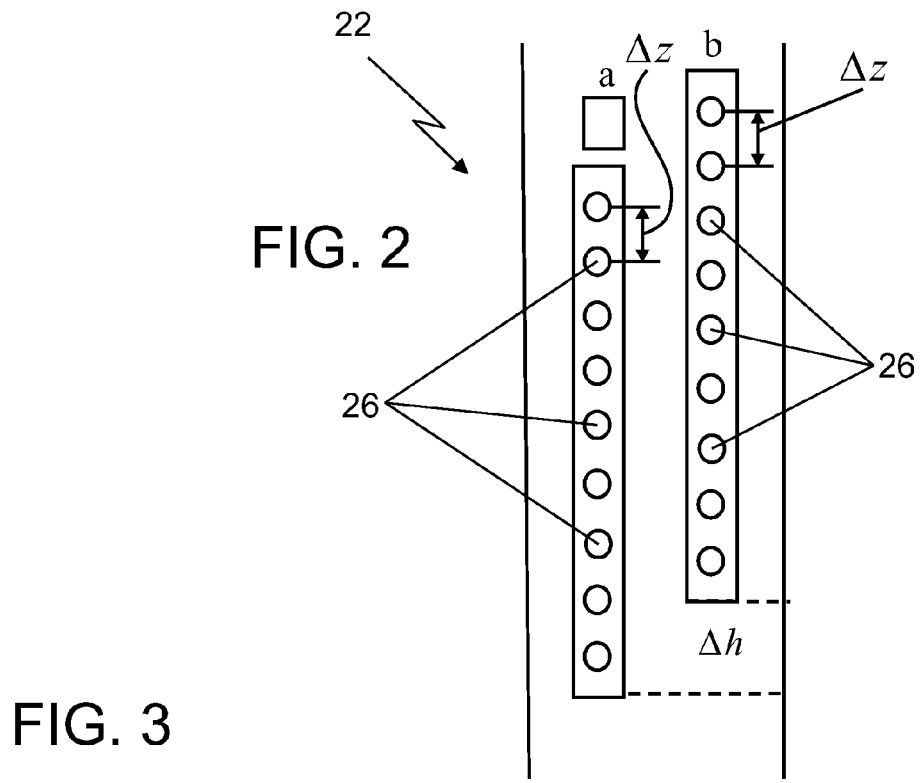
FIG. 2 depicts an exemplary measurement assembly of the system of FIG. 1.

Referring to FIG. 2, the measurement assembly 20 includes a plurality of sensors 26, each of which is displaced or offset from one another by a fixed distance "Δz". In one embodiment, the measurement assembly 20 is configured as a borehole absolute gravity meter with multiple sensors (BH-GMMS), also referred to as a g-string or g-array. The g-array includes two or more absolute gravity sensors disposed in a common housing at fixed spacing between each other. The unknown and/or initial vertical displacement, or vertical component of the unknown displacement of the measurement assembly 20 over time, is shown as "$\Delta h_i$". The vertical component has a direction that may be equal to the direction of gravity and/or a direction parallel to the major axis of the borehole. The displacement is also referred to as positioning error. Assuming that the offset between sensors is stable, the positioning error is the same for all multiple sensors.

Figure 3:
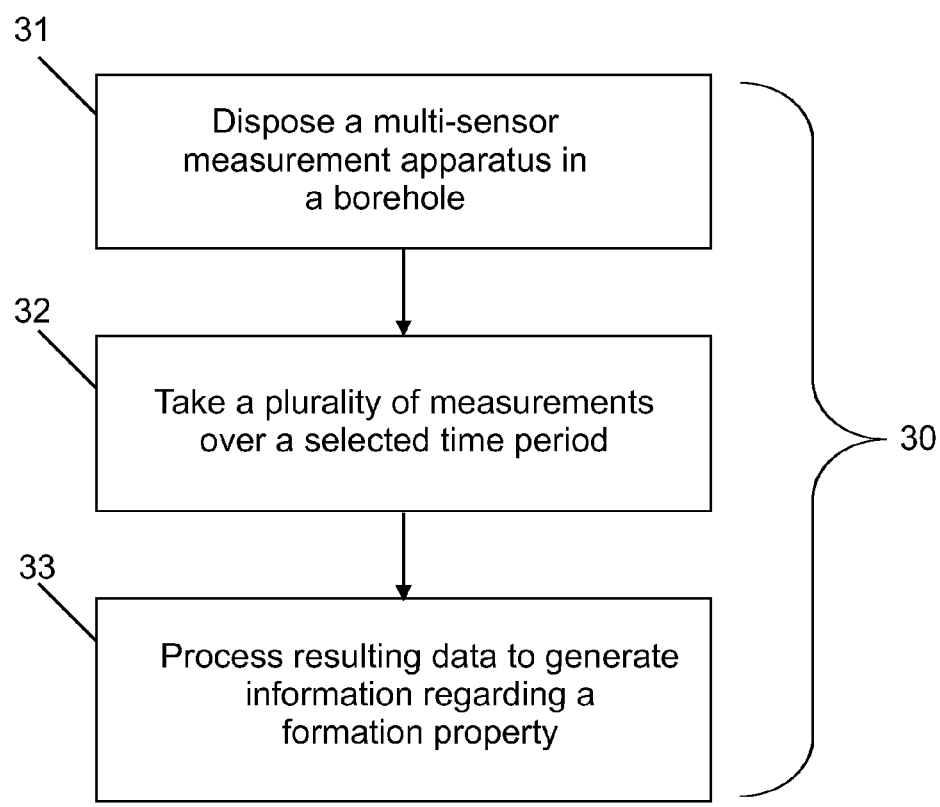
FIG. 3 is a flow chart providing an exemplary method of estimating at least one property of an earth formation.

FIG. 3 illustrates a method 30 of estimating at least one property of an earth formation. The method 30 is used in conjunction with the measurement assembly 20, the data processing unit 22 and/or the surface processing unit 24, although the method 30 may be utilized in conjunction with any suitable combination of processors and sensors. The method 30 includes one or more stages 31, 32 and 33. In one embodiment, the method 30 includes the execution of all of stages 31-33 in the order described. However, certain stages may be omitted, stages may be added, or the order of the stages changed.

The method 30 reduces or eliminates the positioning error related to downhole measurements, such as due to displacement Δh of a sensor over time, which results in unknown positioning errors of the sensors 26 associated with repeated measurements. The method described herein utilizes any sensor assembly or apparatus that includes multiple sensors 26 positioned relative to one another at a fixed offset. In one embodiment, the fixed offset is along the vertical direction. Although the methods described herein are utilized with exemplary gravity sensors, the methods are not limited to such sensors. Other types of sensors may also be utilized, such as nuclear magnetic resonance (NMR) sensors, resistivity sensors, porosity sensors, gamma ray sensors, seismic receivers, acoustic imagers and others. Such sensors are utilized, for example, in logging processes such as wireline logging, measurement-while-drilling (MWD) and logging-while-drilling (LWD) processes.

In the first stage 31, a multi-sensor measurement apparatus such as the measurement assembly 20 is disposed in the borehole 12. The apparatus may be lowered into the borehole via any suitable conveyance, such as the borehole string 11 or a wireline. In one embodiment, the sensors 26 are absolute gravity sensors.

In the second stage 32, a plurality of measurements "M" are taken over a selected time period. Each measurement "M" includes a measurement from each sensor 26 at a selected point in time. Each measurement is separately temporally by a selected period of time. The multi-sensor gravimeter includes a number "N" of gravity sensors positioned at fixed offsets. The total number of gravity measurements is thus equal to N*M. For example, two sequential time-lapse measurements ("No 1" and "No 2") are taken by the plurality of gravity sensors in a multi-sensor gravimeter or g-array. In this case a possible displacement of the g-array during the measurement No 2 with respect to its position during the measurement No 1 is $\Delta h_k$, where k is the number of the measurement series (k=1, . . . , M).

In the third stage 33, data received from the measurement apparatus is processed to generate information regarding at least one property of the formation 14. In one embodiment, the property information is estimated by solving an inverse problem to construct a model of the at least one property.

In one embodiment, gravity data is inverted to generate values of differential density and values of displacements. Such information is useful in observing density variations caused by the movement of gas\water contact, and in measuring fluid motion within a reservoir. Such variations can be estimated from the inverse problem solution for differential borehole gravity data.

In one embodiment, processing the data includes applying a multi-sensor positioning correction (MSPC) to the data obtained from a multi-sensor measurement apparatus such as the measurement assembly 20 that includes the borehole sensors 26. The correction allows for the assessment of the values of unknown displacements $\Delta h_i$, i=1, . . . , M for each pair of sequential time-lapse measurements, as the positioning error is the same for the multiple sensors 26.

For example, the MSPC applies an inversion to the gravity data. In one example, the MSPC utilizes an algorithm for applying an inversion to the gravity measurements to generate a model of formation densities, based on using of the functional of the model field residual $\Phi(\sigma)$:

$$\Phi(\sigma)=\|A\sigma-G\|^2, \quad (1)$$

where "σ" are the unknown anomalous densities (which may indicate water/gas contact locations), "G" is the vector of the gravity measured downhole, and "A" is a forward problem matrix. Different approaches can be implemented to invert gravity data (Tikhonov regularization, Kalman filters, principal component inversion, etc.)

In the case of multi-sensor positioning correction, modification of the functional of the model field residual is performed, and the functional takes this form:

$$\Phi(\sigma,\Delta h)=\|A\sigma+B\Delta h-G\|^2 \quad (2)$$

Here "Δh" is a vector of length M, containing elements $\Delta h_k$. Matrix "B" elements determine the impact of a unit displacement on the measured gravity field, and they have this form:

$$b_{i,j} = K\delta_{i,j}, i = 1, \ldots, N\cdot M, j = 1, \ldots, M,$$

where $$\delta_{i,j} = \begin{cases} 1, & \text{if } i = (j-1)\cdot N + 1, (j-1)\cdot N + 2, \ldots, (j-1)\cdot N + N \\ 0, & \text{other case} \end{cases}$$

The function K depends on the vertical gradient of the gravity field, and also on variations in the density of the medium in which the gravity measurements are performed. In a particular case of a homogeneous medium of density ρ the function K has this simple representation:

$$K=308.6-83.84\rho$$

where the number 308.6 is a value of the normal gradient.

Although the model and position correction described herein are described in conjunction with unknown density values, any downhole and/or geophysical values or properties may be used. Thus, for the functionals described above, "σ" is an arbitrary property of a medium or component of interest (such as an earth formation), "G" is the vector of the arbitrary geophysical field related to the arbitrary property, and "A" is the forward problem matrix. The elements of Matrix B, such as in the case of gravity, determine the impact of a unit displacement of the multi-sensor tool on the measured arbitrary geophysical field.

The inversion described herein does not depend on data contents, and accordingly, any type of data may be used. Examples of such data include data resulting from various measurements taken of formation and/or borehole properties using surface sensors and/or sensors positioned within the borehole, as well as measurements relating to downhole or surface components of various well logging, production and/or drilling devices and systems. Examples of such measurements include formation and/or fluid sample measurements, formation evaluation measurements such as resistivity and nuclear magnetic resonance (NMR) measurements, and drilling or production measurements such as fluid temperature and fluid flow rates. The data utilized in the systems, devices and methods described herein are not limited to the specific data types described herein.

In this example, the density "ρ" is assumed to be a constant (e.g., ρ=2.45 g/cc). In one embodiment, the value of density is treated as a priori information. Different types of density logging can be used to provide each borehole gravity station with an appropriate density value.

Thus, utilization of the modified functional (2) can be used not only for finding unknown anomalous densities, but also for estimating the gravimeter positioning error δg for any two repeated measurements. The algorithm described herein enables users to determine unknown displacements due to repeated positioning of the set of sensors. The more sensors involved in measurements, the smaller the random error of each gravity sensor is, and the higher the accuracy that can be achieved when these displacements are determined.

Figure 4:
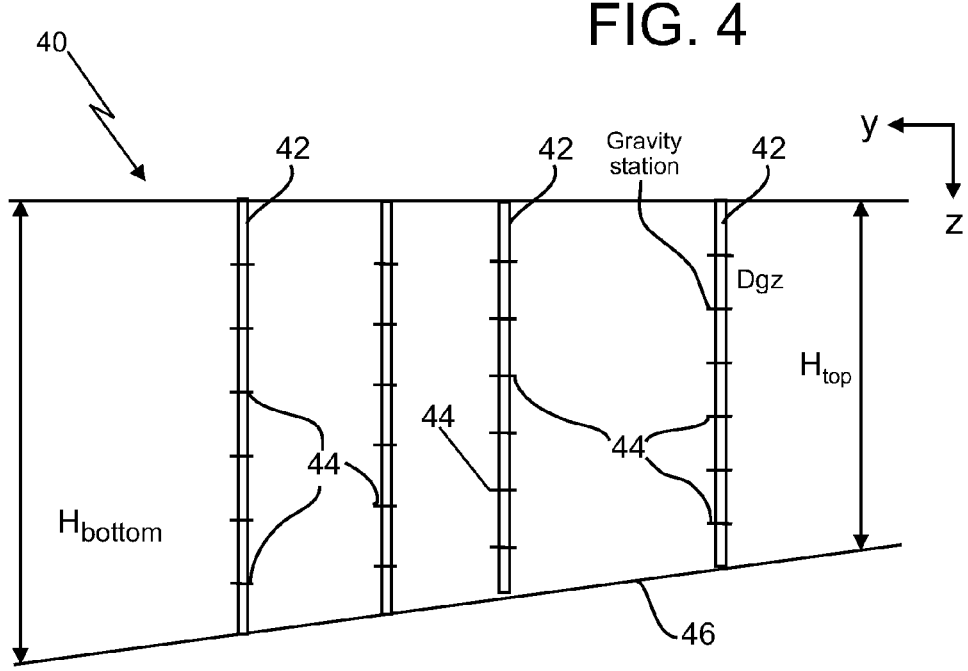
FIG. 4 is a cross-sectional view of an underground formation model.
Figure 5:
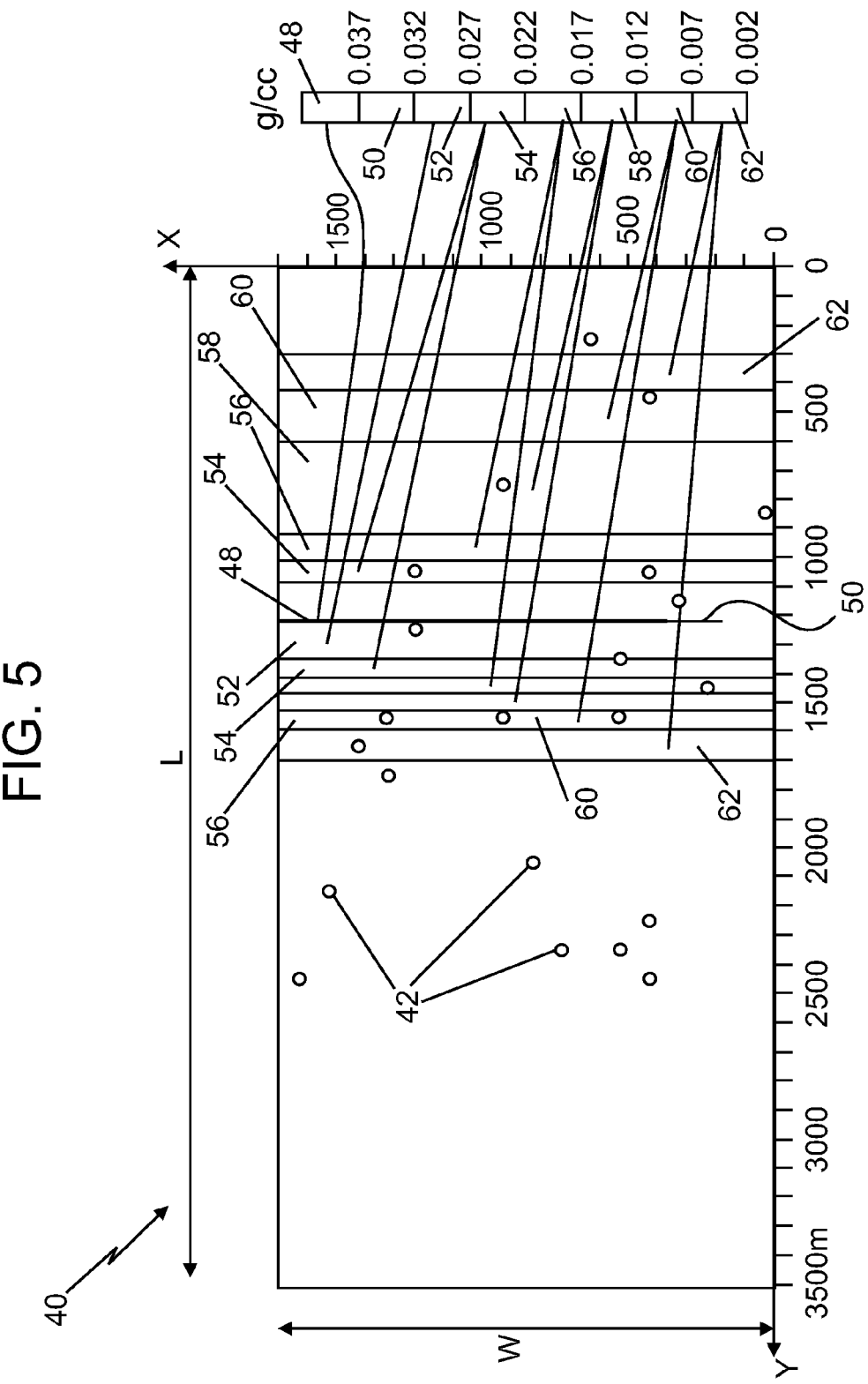
FIG. 5 is a top view of the underground formation model of FIG. 4.

Referring to FIGS. 4 and 5, an example of the method 30 described herein is shown in conjunction with a synthetic underground formation model 40. A cross-sectional view of the sensor configuration used to generate the model 40 is shown in FIG. 4. The configuration includes a plurality of boreholes 42 drilled into the formation 14. The multi-sensor measurement assembly 20 is used to measure gravity at a plurality of locations 44 between the surface and the gas/saturated water layer. within each borehole. A relatively thin, inclined petroleum reservoir 46 is also shown. The reservoir is rectangular in a top view, as seen in FIG. 5, and has a length "L" and a width "W". FIG. 5 shows a top view of the reservoir 14 and the boreholes 42, and also shows the distribution of density in the reservoir model at a fixed point of time during the gravity survey, shown by areas designated as numerals, 48, 50, 52, 54, 56, 58, 60 and 62. The model is a three-dimensional model having orthogonal axes x, y and z. In this model, the z-axis extends in the vertical direction.

The model includes a plurality of selected true values of density that are correlated to corresponding grids cells to form a selected density distribution that is to be estimated by the inversion algorithm using the measurement assembly 20. The true values of density are fixed while the inversion algorithm is run. Notations and values of model parameters are shown in the following table:

| Parameter | Notation | Value |
|---|---|---|
| Depth of reservoir upper edge [m] | $H_{top}$ | 2610 |
| Depth of reservoir lower edge [m] | $H_{bottom}$ | 3820 |
| Simulation grid square cell size [m] | $D_{cell}$ | 100 |
| Anomalous density distribution (g/cc) | 48-62 | 0.002-0.037 |
| Random borehole grid | | 42 |
| Distance between borehole gravity stations [m] | Dgz | 20 |
| Number of borehole gravity stations | $N_{st}$ | 51 |
| Gaussian random noise for borehole signal [μGal] | $\delta_0$ | 0, 1, 3 |
| Precisions of the repeated location of the borehole gravity meter [cm] | $\delta_l$ | ±0, 5, 10, 15 |

The location of water/gas contact is simulated by anomalous density changes in discrete elements of the reservoir. Expected changes in the anomalous gravity field reflect changes in reservoir fluid densities. The results described are based on forward/inverse gravity modeling for the model shown in FIGS. 4-5.

FIGS. 6-10 illustrate three types of gravity measurements: borehole gravity measurements taken with a single absolute gravity sensor at a single location, vertical gradient of the borehole gravity measurements taken with the single sensor, and absolute borehole gravity measurements taken with a multi-sensor gravimeter such as the measurement assembly 20. The gravity sensors are absolute and/or relative gravimeters. An absolute gravimeter measures the actual value of g with a precision of, for example, about 1 μGal. A relative gravimeter measures relative changes in g with a certain precision, such as about 10 μGal in about 5 min. The relative gravity measurements are tied to the absolute gravity network.

Vertical gradient sensors are configured to estimate a vertical gradient of gravity between the end points of interval "ΔH" by continuously or intermittently measuring the gravitational field as the sensors are moved vertically between the interval ΔH. A "vertical gradient" of borehole gravity, for a vertical borehole interval, is the ratio of the gravity differences to the height differences as measured between the end points of the interval.

Figure 6A:
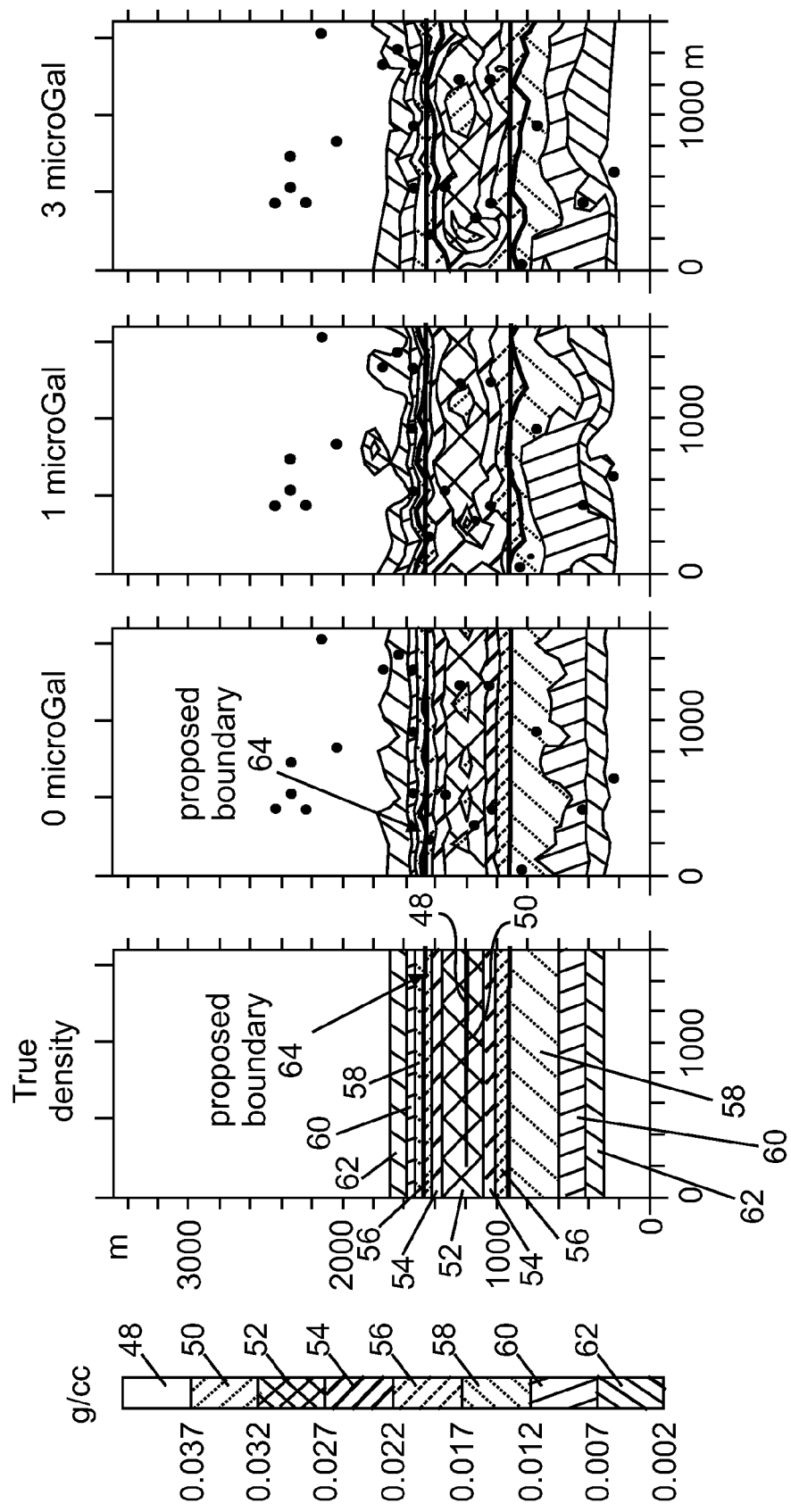
FIGS. 6A and 6B depict exemplary results of the inversion of gravity measurements taken with a single gravity sensor.
Figure 6B:
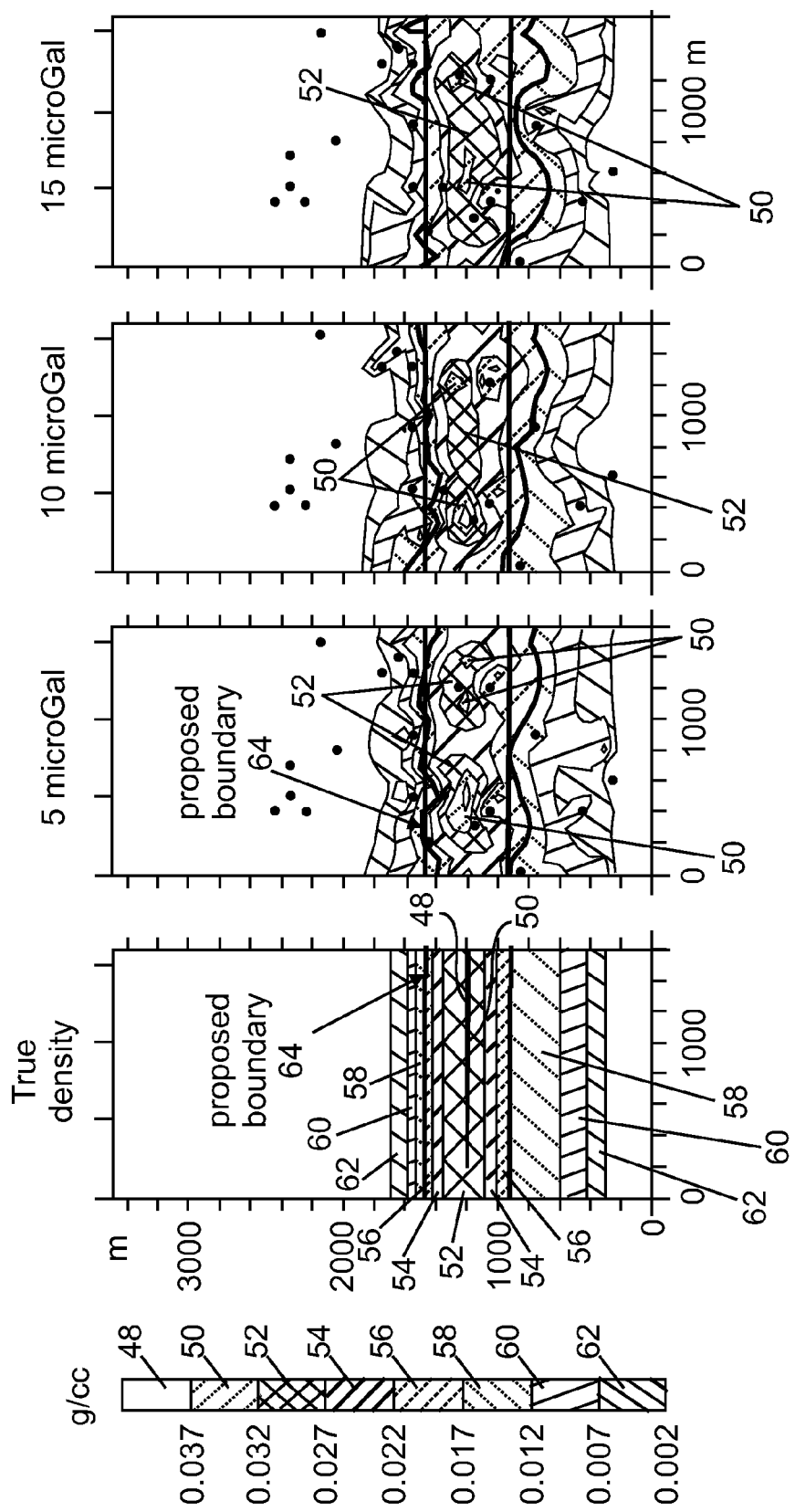

Referring to FIGS. 6A and 6B, the density distribution results for solving the inverse problem of borehole gravity measurements using a single sensor are shown.

These results reflect a number of assumptions. The Gaussian random noise $\delta_0$ in the signal of gravity sensor is assumed to have values of 0, 1 and 3 μGal. The uncertainty $\Delta h_l$ in the location of the sensor when repeated measurements are conducted is assumed to have values of 0, 5, 10 and 15 cm, which is equivalent to an additional random noise $\delta_l$ of 0, 5, 10, and 15 μGal. Thus, the anomalous density distribution results by solving the inverse problem are shown for total errors $\delta_\Sigma = \sqrt{\delta_0^2 + \delta_l^2}$ of 0, 1, 3, 5, 10, and 15 μGal the contaminated the calculated signal. The water-gas transient contact zone is bounded approximately by the 0.017 g/cc density isoline, and is denoted as boundary 64.

As shown in FIG. 6A, the inversion using a single gravity sensor produces a relatively good approximation of the original density distribution (error equals zero) for errors $\delta_\Sigma \sim 1\text{-}3$ μGal. For all other cases considered, accuracy of the solution to the inverse problem gets worse as the noise level increases. If $\delta_\Sigma \leq 5$ μGal, as shown for example in FIG. 6B, the smoothing image provides some information about the location of the boundary, but the image is diffused and unfocused.

Referring to FIG. 7, the density distribution results are shown for solving the inverse problem for vertical gradient of gravity between the end points of an interval ΔH=10 m, using a single gravity sensor. The anomalous density distribution results by solving the inverse problem are shown for total errors $\delta_\Sigma = \sqrt{\delta_0^2 + \delta_i^2}$ of 0, 1.4 and 4.2 μGal that contaminated the calculated signal. As shown in FIG. 7, the inverted differential density shows a poor resolution if $\delta_\Sigma \leq 1.4$ μGal. For such errors, the zone of inverted anomalous density loses its connectedness, and thus no boundary can be practically tracked.

Figure 8A:
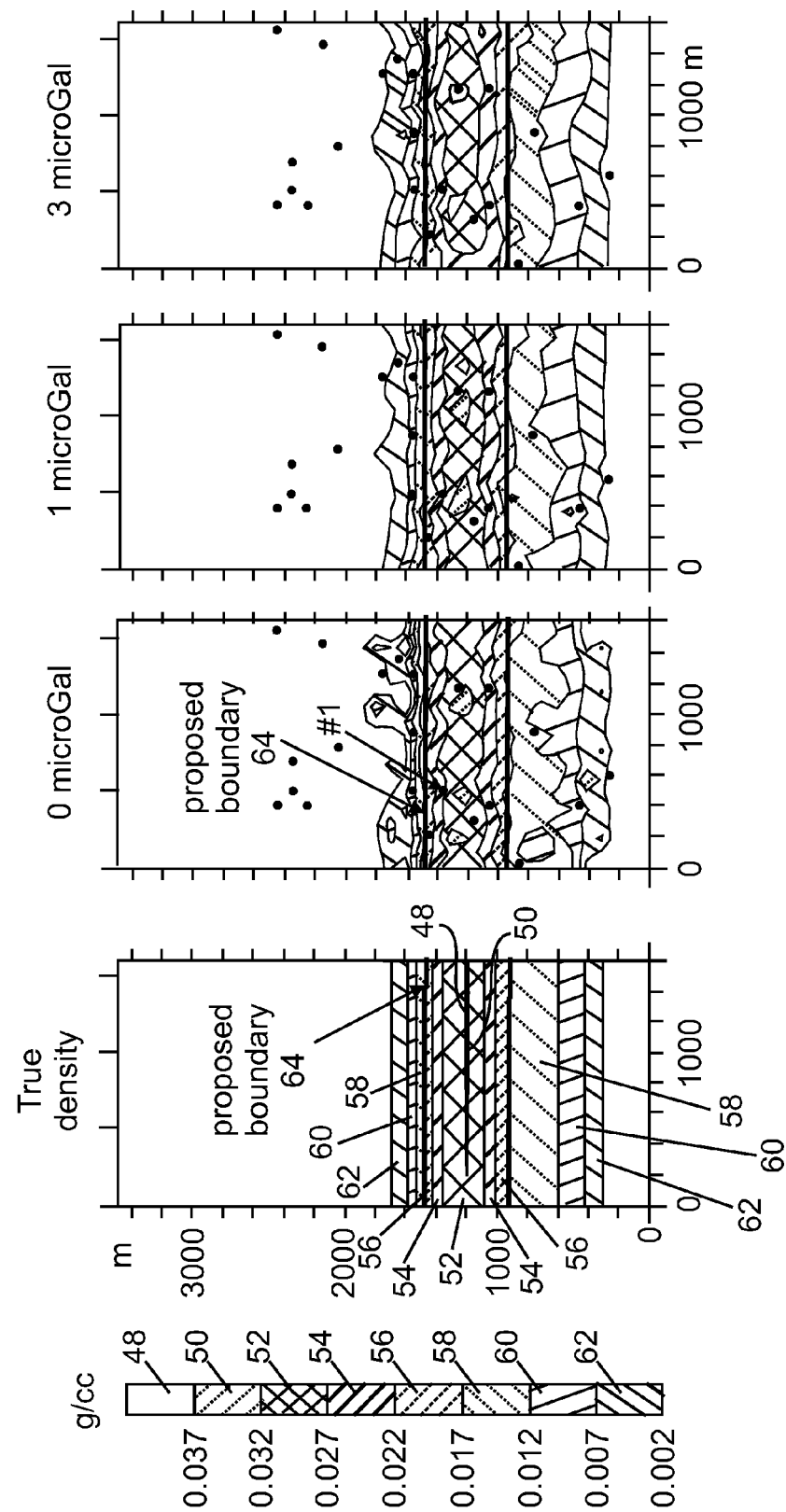
FIGS. 8A and 8B depict exemplary results of the inversion of gravity measurements taken with the exemplary measurement assembly of FIG. 2.
Figure 8B:
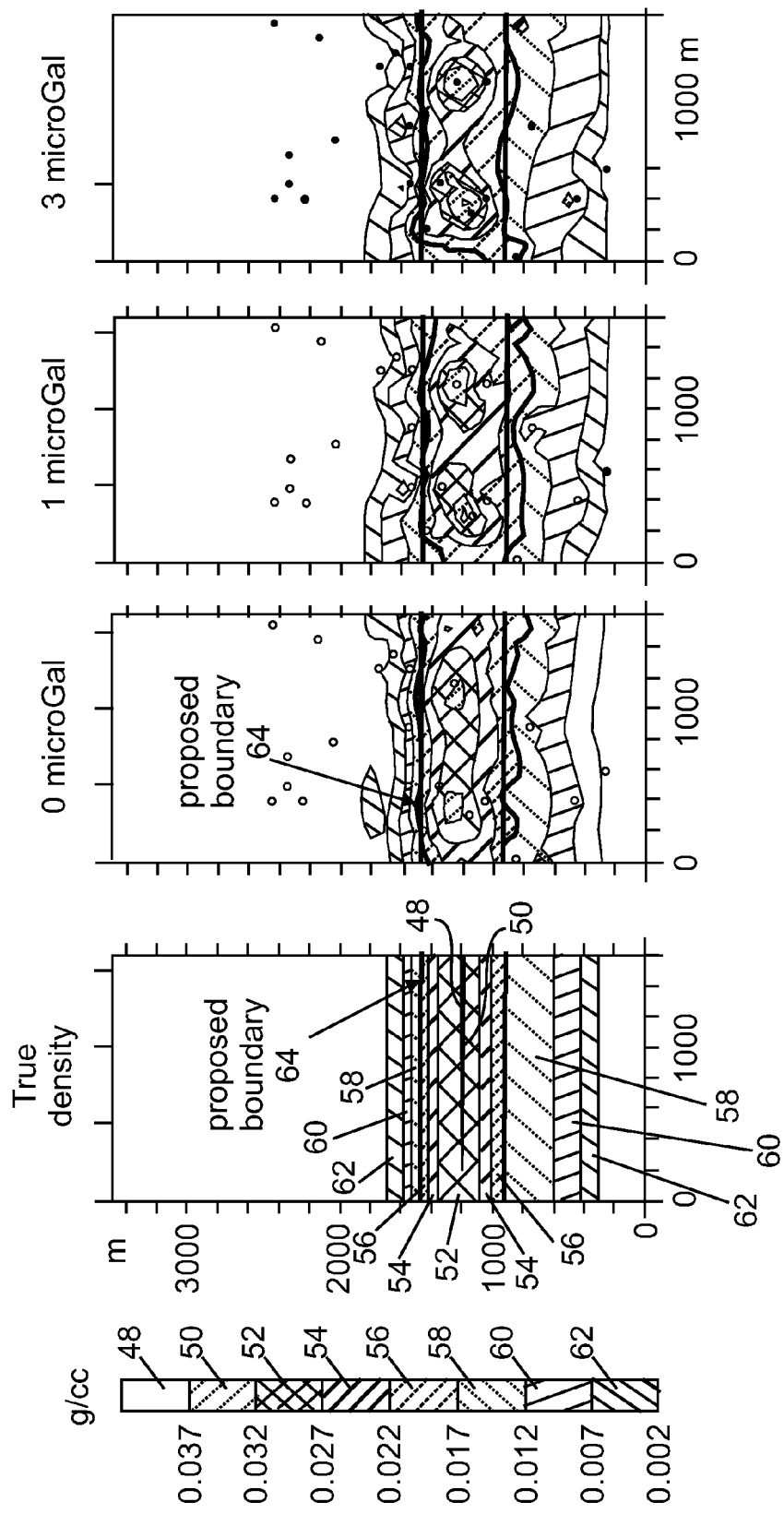

Referring to FIGS. 8-9, the density distribution results are shown for solving the inverse problem for gravity measurements using the multi-sensor gravimeter. In this example, the gravimeter includes nine sensors each having a vertical separation of one meter (Δz=1 m). The results are shown in FIGS. 8A and 8B for uncertainties $\Delta h_i$ (in the location of all nine sensors) of 0 and 5 cm respectively, and in FIGS. 9A and 9B for uncertainties of 10 and 15 cm respectively. As shown in FIGS. 8A-B and 9A-B, none of the images are diffused, and for all cases considered, the gas/water contact boundary can be revealed and tracked. Thus, this method utilizing a multi-sensor measurement assembly as described herein is advantageous over conventional gravity measurements.

Figure 10:
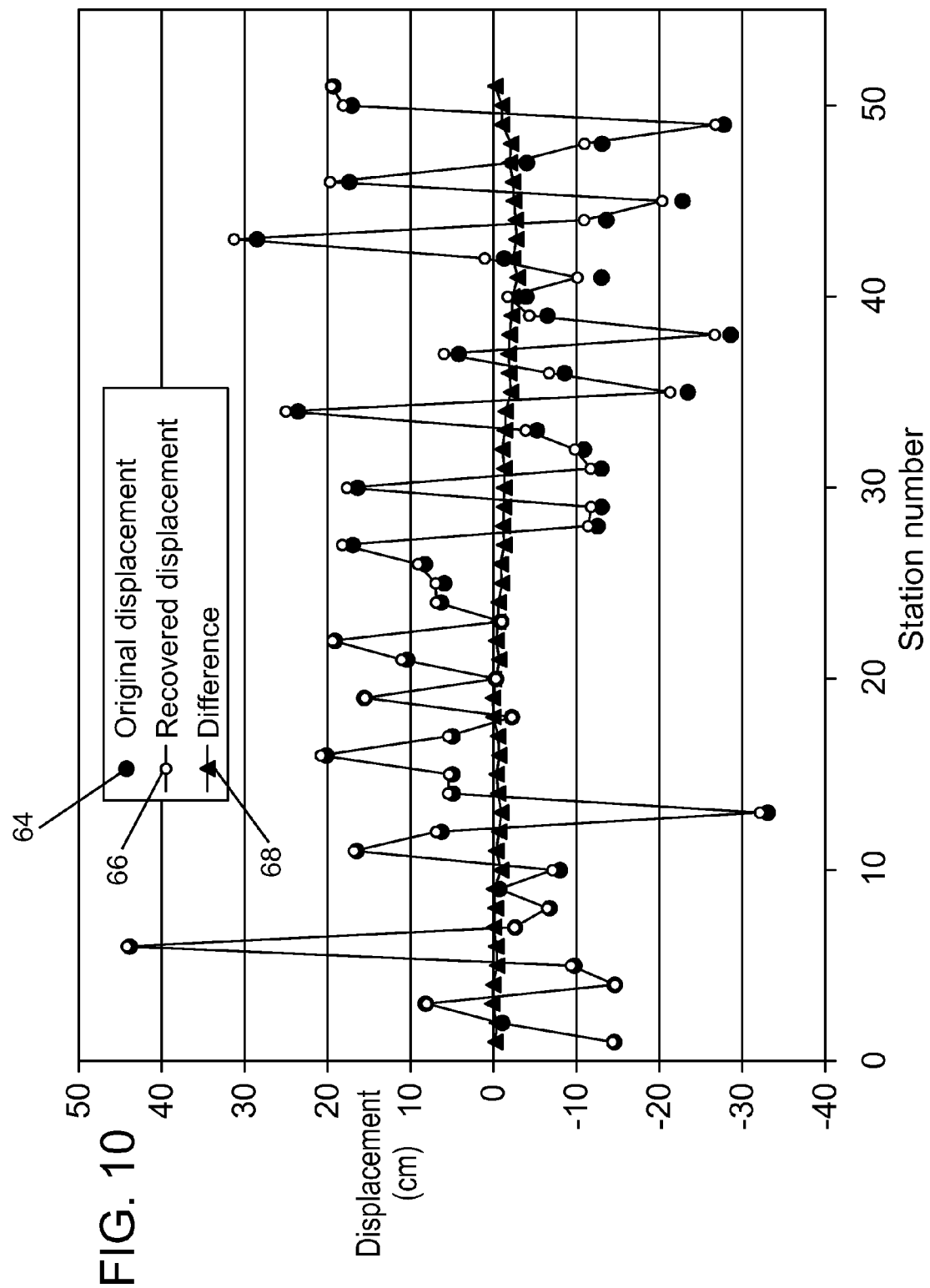
FIG. 10 depicts data relating to displacements of gravity sensors estimated by the method of FIG. 3.

FIG. 10 illustrates the capability of the method to generate not only density distribution data but also unknown displacements $\Delta h_i$. FIG. 10 includes data from multiple gravity stations at various locations in an exemplary borehole. The locations of the multi-sensor gravimeter measurements are identified by station number and each has an original displacement in a borehole represented by curve 64. Displacements are defined as Gaussian random quantities with zero mean. Therefore different values of displacements have been assigned to all gravity stations in all boreholes. The data retrieved from the gravimeters is incorporated into functional equation (2). FIG. 10 also includes recovered displacements 66 obtained through the inversion with the method 30, and the difference 68 between the original and inverted displacements. All these results show a good capability of MSPC inversion to perform a positioning correction.

Figure 11:
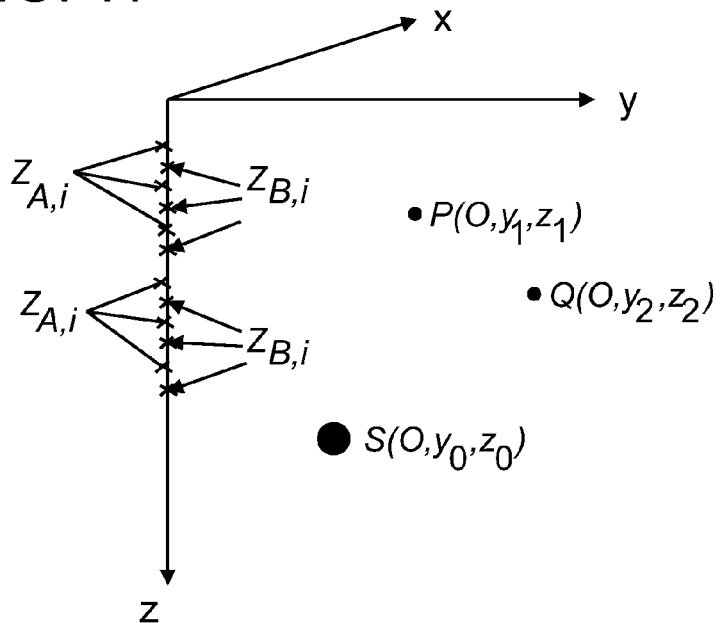
FIG. 11 is a cross-sectional view of an underground formation model.

Referring to FIG. 11, a model is shown illustrating advantages of the method 30 described herein. The model includes two masses m and M situated in free space having orthogonal axes x, y and z. In this model, the z-axis extends in the vertical direction. At a first point in time "t", i.e., t≤$t_1$, the mass m is located at location P having coordinates (0, $y_1$, $z_1$). At a later time, i.e. t>$t_1$, the mass m begins to shift and at t≥$t_2$ reaches a fixed position in the point Q with the coordinates (0, $y_2$, $z_2$). The mass M is located in the point S with the time-independent coordinates (0, $y_0$, $z_0$) and satisfies the condition that the gravity field of the mass M is by several orders of magnitude greater than the field created by the mass m, i.e., M>>>m.

Initial measurements are performed at t≤$t_1$ and again at t≥$t_2$ using a measuring system located on the z-axis. The gravitational field $g_z$ is measured in points $z_{A,i}$, i=N=1, ..., N at t≤$t_1$, and the field $g_z$ is measured in points $z_{B,i}$, i=1, ..., N at t≥$t_2$.

The goal is to find relative displacements $\Delta y_{2,1}$, $\Delta z_{2,1}$ of the mass m, represented by the following equations:

$$\Delta y_{2,1} = y_2 - y_1, \Delta z_{2,1} = z_2 - z_1, \quad (3)$$

In the instance where the measurements are used for gravity monitoring of the reservoir, the gravity field of the mass M corresponds to the Earth's normal field, and the field of the mass m, to the anomalous gravity field created due to the moving water-gas contact. The measuring system models the time-lapse borehole observations of the gravity field.

During the re-observation of the gravity field on the z axis, due to the error in positioning the gravimeter, the coordinates of the measurement points $z_{A,i}$, $z_{B,i}$ differ from one another by the unknown values $\Delta z_i$:

$$z_{B,i} = z_{A,i} + \Delta z_i, i=1, ..., N \quad (4)$$

It is known that the gravity field of each of the masses mentioned has the following form on the z-axis:

$$g_{z,m}(z, t_1) = Gm \frac{z - z_1}{[(z-z_1)^2 + y_1^2]^{3/2}}, t = t_1 \quad (5)$$

$$g_{z,m}(z, t_2) = Gm \frac{z - z_2}{[(z-z_2)^2 + y_2^2]^{3/2}}, t = t_2 \quad (6)$$

$$g_{z,M}(z) = GM \frac{z - z_0}{[(z-z_0)^2 + y_0^2]^{3/2}}. \quad (7)$$

Due to the superposition principle, the total gravity field $g_z$ measured on the z-axis can be written out as following:

$$g_z(z,t_1) = g_{z,M}(z) + g_{z,m}(z,t_1)$$

$$g_z(z,t_2) = g_{z,M}(z) + g_{z,m}(z,t_2) \quad (8)$$

One can use the difference in the gravity field values measured at two consecutive moments of time $t_1$, $t_2$ in measuring anomalous gravity fields, shown as the differential field $\Delta g_z$:

$$\Delta g_z = g_z(z,t_2) - g_z(z,t_1). \quad (9)$$

This equation can be re-written as follows:

$$\Delta g_z = (g_{z,m}(z_B,t_2) - g_{z,m}(z_A,t_1)) + (g_{z,M}(z_B,t_2) - g_{z,M}(z_A,t_1)) \quad (10)$$

It should be noted that the field $\Delta g_z$ at a fixed z coordinate depends on three unknown parameters of the problem: relative displacements of the mass m: $\Delta y_{2,1}$, $\Delta z_{2,1}$ and the error array for the re-positioning of the meter: $\Delta z_i$, i=1, ..., N. In the linear approximation, for each i-th observation point, equation (10) may be re-written as follows:

$$\Delta g_z \approx \frac{\partial g_{z,m}(z_{A,i})}{\partial z_1} \Delta z_{2,1} + \frac{\partial g_{z,m}(z_{A,i})}{\partial y_1} \Delta y_{2,1} + \frac{\partial g_{z,m}(z_{A,i})}{\partial z_{A,i}} \Delta z_i + \frac{\partial g_{z,M}(z_{A,i})}{\partial z_{A,i}} \Delta z_i \quad (11)$$

If the error associated with the re-positioning of the sensor during repeated borehole observations is negligible ($\Delta z_i \equiv 0$), the problem under consideration contains only two desired unknowns $\Delta y_{2,1}$, $\Delta z_{2,1}$. If the number of observation points N>>2, then for a set of N values of the differential gravity field $\Delta g_z$, the estimate for $\Delta y_{2,1}$, $\Delta z_{2,1}$ can be obtained, e.g., using the least square method or any other suitable approach.

However, in real field situations the re-positioning error is not negligible, i.e., $\Delta z_i \neq 0$, and the problem becomes more complex. Because the condition M>>>m is satisfied, the last term in equation (11) brings a huge uncontrollable error into the differential field $\Delta g_z$, because $\Delta z_i$ values are unknown. A formal difficulty here could be that the number of unknowns in the example under consideration becomes N+2 (N unknown $\Delta z_i$ and 2 values $\Delta y_{2,1}$, $\Delta z_{2,1}$).

The method 30 described herein provides a solution to this difficulty. The multi-sensor gravimeter generates not one but M values of the borehole gravity field for each position of the gravity meter in the borehole. It should be noted that, at a fixed position of the gravity meter, each of these M measurements will have the same positioning error. Thus, the number of unknowns remains the same: N+2, but the number of equations increases to N·M. These additional equations allow estimates of all unknown parameters to be obtained, including N values of the tool displacement due to re-positioning.

As described herein, "borehole" or "wellbore" refers to a single hole that makes up all or part of a drilled well. As described herein, "formations" refer to the various features and materials that may be encountered in a subsurface environment. Accordingly, it should be considered that while the term "formation" generally refers to geologic formations of interest, that the term "formations," as used herein, may, in some instances, include any geologic points or volumes of interest (such as a survey area) including the fluids contained therein. Furthermore, various drilling or completion service tools may also be contained within this borehole or wellbore, in addition to formations.

In addition, it should be noted that "drillstring" or "string" as used herein, refers to any structure or carrier suitable for lowering a tool through a borehole or connecting a drill bit to the surface, and is not limited to the structure and configuration described herein. For example, the borehole string 11 is configured as a hydrocarbon production string or formation evaluation string. Furthermore, although the assembly 20 is described as being disposed in or in communication with a borehole, the assembly 20 is not limited. The assembly 20 may be utilized for any desired surface or downhole pressure measurement and may be incorporated into or disposed with any suitable carrier. The term "carrier" as used herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, BHA's, drill string.

The apparatus and methods described herein provide various advantages over prior art techniques. The apparatus and method provide a reliable solution for estimating errors in measurement data due to sensor positioning errors, and thus provide for more repeatable measurements than available with prior art devices and methods. Such repeatability is of a primary importance for 4D borehole gravity surveys, i.e., three-dimensional gravity surveys that are repeated over time, because at two successive points of time it is unlikely to locate an instrument at the same location.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus for estimating a property of an earth formation, the apparatus comprising:
a carrier configured to be deployed according to a selected position relative to the formation, the carrier including at least one sensor array, the at least one sensor array including a plurality of sensors configured to estimate at least one property, each of the plurality of sensors located at a known position relative to one another; and
a processor in operable communication with the plurality of sensors and configured to estimate uncertainties of the location of the plurality of sensors based on a plurality of sequential time-lapse measurements from each of the plurality of sensors, the plurality of sequential time-lapse measurements including a first measurement from at least two of the plurality of sensors at a first time at which the carrier is deployed according to the selected position and a second measurement from the at least two of the plurality of sensors at a later time at which the carrier is deployed according to the same selected position.

2. The apparatus of claim 1, wherein the processor is configured to apply an inversion algorithm to data generated by the plurality of sensors and construct a model of the formation based on the data.

3. The apparatus of claim 2, wherein the inversion algorithm includes a model field residual represented by the following equation:

$$\Phi(\sigma, \Delta h) = \|A\sigma + B\Delta h - G\|^2,$$

wherein "σ" is a selected property, "Δh" is a vector representing an initial displacement of the apparatus, "A" is a forward problem matrix, "B" is a matrix representing an impact of a displacement on the selected property measurement data and "G" is the vector of a field related to the selected property.

4. The apparatus of claim 3, wherein the data includes gravity measurement data, the model is a model of formation densities, the selected property is an unknown anomalous density and "G" is a vector of the gravity measurement data.

5. The apparatus of claim 2, wherein the data is gravity measurement data, and the model is a model of a density distribution of the formation.

6. The apparatus of claim 1, wherein the at least one sensor array includes:
a first sensor array including a first plurality of sensors configured to estimate at least one property, each of the first plurality of sensors arrayed axially and located at a known position relative to one another;
a second sensor array including a second plurality of sensors configured to estimate the at least one property, each of the second plurality of sensors arrayed axially and located at a known position relative to one another, the second sensor array offset axially from the first sensor array by a fixed distance.

7. The apparatus of claim 6, wherein the axis is a vertical axis parallel to a direction of gravitational acceleration.

8. The apparatus of claim 1, wherein the carrier is configured to be conveyed into a borehole, the plurality of sensors being disposed at the carrier.

9. The apparatus of claim 1, wherein the plurality of sensors are configured to each take the plurality of sequential time-lapse measurements at the selected position, each of the plurality of measurements being temporally separated within a selected time period.

10. A method of estimating a property of an earth formation, the method comprising:
deploying a carrier according to a selected position relative to the formation, the carrier including at least one sensor array including a plurality of sensors, the plurality of sensors located at a known position relative to one another;
estimating at least one property via the plurality of sensors by taking at least two sequential time-lapse measurements from each of the plurality of sensors, the at least two sequential time-lapse measurements including a first measurement from at least two of the plurality of sensors at a first time at which the carrier is deployed according to the selected position and a second measurement from the at least two of the plurality of sensors at a later time at which the carrier is deployed according to the same selected position; and
estimating uncertainties of the location of the plurality of sensors within the selected time period based on the at least two sequential time-lapse measurements from each of the plurality of sensors.

11. The method of claim 10, further comprising applying an inversion algorithm to data generated by the at least two measurements and constructing a model of the formation based on the data.

12. The method of claim 11, wherein the inversion algorithm includes a model field residual represented by the following equation:

$$\Phi(\sigma, \Delta h) = \|A\sigma + B\Delta h - G\|^2,$$

wherein "σ" is a selected property, "Δh" is a vector representing an initial displacement of the apparatus, "A" is a forward problem matrix, "B" is a matrix representing an impact of a displacement on the selected property measurement data and "G" is the vector of a field related to the selected property.

13. The method of claim 12, wherein the data includes gravity measurement data, the model is a model of formation densities, the selected property is an unknown anomalous density and "G" is a vector of the gravity measurement data.

14. The method of claim 11, wherein the data is gravity measurement data, and the model is a model of a density distribution of the formation.

15. The method of claim 10, wherein disposing includes disposing the carrier at the selected position in a borehole, the plurality of sensors being disposed at the carrier.

16. The method of claim 10, wherein the at least one sensor array includes:
a first sensor array including a first plurality of sensors configured to estimate at least one property, each of the first plurality of sensors arrayed axially and located at a known position relative to one another;
a second sensor array including a second plurality of sensors configured to estimate the at least one property, each of the second plurality of sensors arrayed axially and located at a known position relative to one another, the second sensor array offset axially from the first sensor array by a fixed distance.

17. The method of claim 10, wherein the selected position is on a vertical axis parallel to a direction of gravitational acceleration.

18. A non-transitory computer readable medium encoded with a computer program product comprising machine readable instructions for estimating a property of an earth formation by implementing a method comprising:
deploying a carrier according to a selected position relative to the formation, the carrier including at least one sensor array including a plurality of sensors, the plurality of sensors located at a known position relative to one another;
estimating at least one property via the plurality of sensors by taking at least two sequential time-lapse measurements from each of the plurality of sensors, the at least two sequential time-lapse measurements including a first measurement from at least two of the plurality of sensors at a first time at which the carrier is deployed according to the selected position and a second measurement from the at least two of the plurality of sensors at a later time at which the carrier is deployed according to the same selected position; and
estimating uncertainties of the location of the plurality of sensors within the selected time period based on the at least two sequential time-lapse measurements from each of the plurality of sensors.

19. The non-transitory computer readable medium of claim 18, wherein the method further comprises applying an inversion algorithm to data generated by the at least two measurements and constructing a model of the formation based on the data.

20. The non-transitory computer readable medium of claim 19, wherein the inversion algorithm includes a model field residual represented by the following equation:

$$\Phi(\sigma, \Delta h) = \|A\sigma + B\Delta h - G\|^2,$$

wherein "σ" is a selected property, "Δh" is a vector representing an initial displacement of the apparatus, "A" is a forward problem matrix, "B" is a matrix representing an impact of a displacement on the selected property measurement data and "G" is the vector of a field related to the selected property.

21. The non-transitory computer readable medium of claim 20, wherein the data includes gravity measurement data, the model is a model of formation densities, the selected property is an unknown anomalous density and "G" is a vector of the gravity measurement data.

22. The non-transitory computer readable medium of claim 19, wherein the data is gravity measurement data, and the model is a model of a density distribution of the formation.

23. The non-transitory computer readable medium of claim 18, wherein deploying includes deploying the carrier at the selected position in a borehole, the plurality of sensors being disposed at the carrier.

24. The non-transitory computer readable medium of claim 18, wherein the at least one sensor array includes:
a first sensor array including a first plurality of sensors configured to estimate at least one property, each of the first plurality of sensors arrayed axially and located at a known position relative to one another;
a second sensor array including a second plurality of sensors configured to estimate the at least one property, each of the second plurality of sensors arrayed axially and located at a known position relative to one another, the second sensor array offset axially from the first sensor array by a fixed distance.

25. The non-transitory computer readable medium of claim 18, wherein the selected position is on a vertical axis parallel to a direction of gravitational acceleration.

* * * * *